UNITED STATES PATENT OFFICE 2,166,437

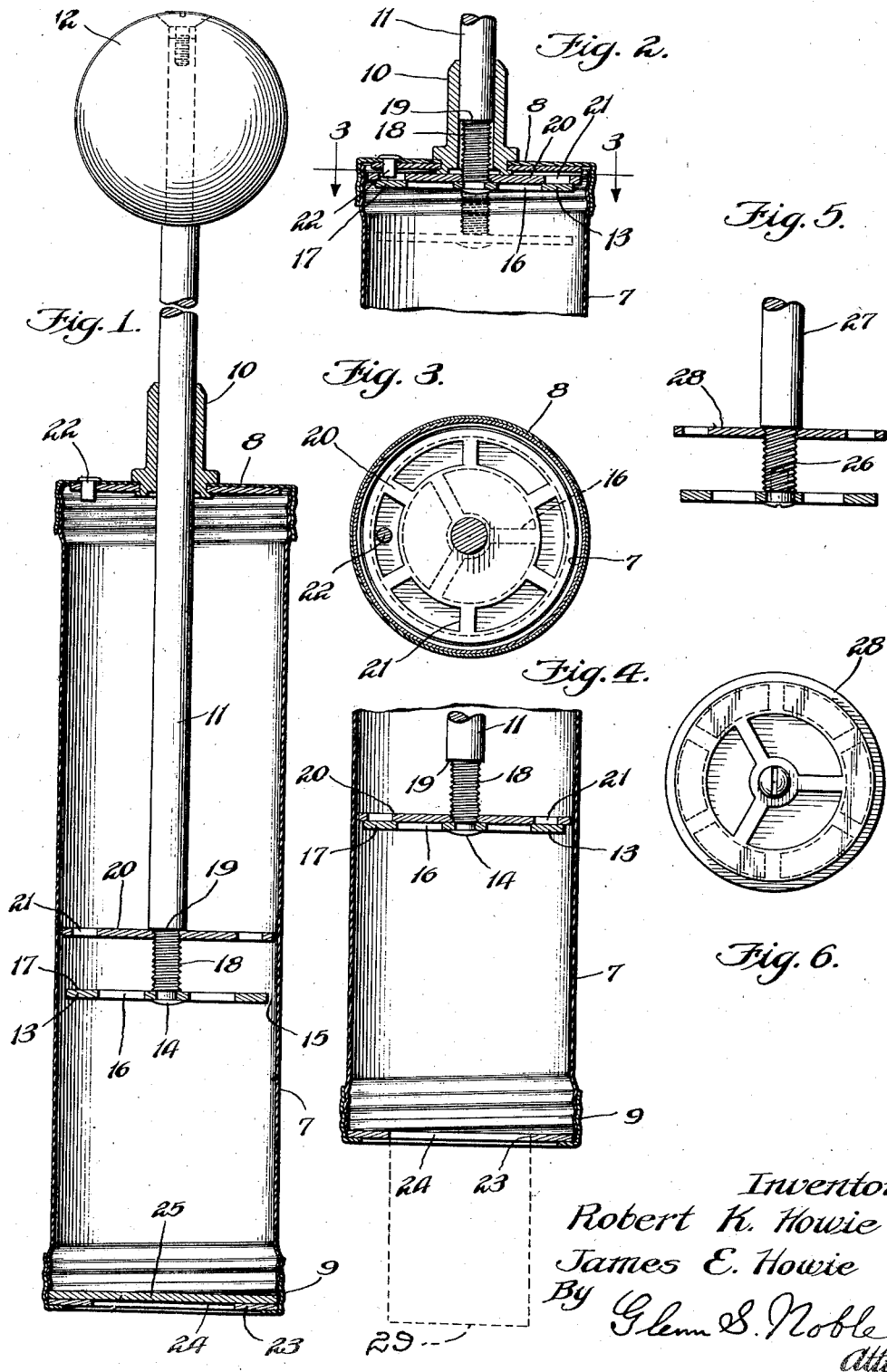

MIXING AND MOLDING DEVICE

Robert K. Howie and James E. Howie, Chicago, Ill.

Application February 16, 1938, Serial No. 190,801

7 Claims. (Cl. 259—47)

This device is intended for mixing and molding various substances or articles and is adapted for mixing coloring in oleomargerine, mixing certain plastics, and molding pastry or the like.

The principal objects of the invention are to provide a device of the character set forth which may be economically made which will be durable and particularly rapid and efficient in use, simple in construction, and readily disassembled for cleaning.

Other objects and advantages will appear from the following description taken in connection with the accompanying drawing in which Fig. 1 is a longitudinal sectional view of the device with the parts adjusted for mixing or agitating;

Fig. 2 is a sectional detail showing one arrangement for adjusting the mixing and expelling devices;

Fig. 3 is a sectional view taken on the line 3—3 of Fig. 2;

Fig. 4 is a sectional detail showing the parts adjusted for molding or expelling the material;

Fig. 5 is a sectional detail showing a slightly modified form of mounting for the mixing members; and Fig. 6 is a bottom plan view of the parts shown in Fig. 5.

In the particular embodiment of the invention as shown in the drawing, 7 is a barrel or cylinder having a detachable cap 8 at one end and a detachable flanged ring or closure member 9 at the opposite end. These parts are shown as being screwed onto the end of the barrel but any suitable detachable connection may be employed.

The cap or cover 8 has a central bearing 10 for a reciprocable piston rod 11 having a handle 12 at its upper or outer end. The lower or inner end of the rod 11 is provided with a disc 13 which may be secured thereto by a shouldered riveted portion 14 or in any other suitable manner. The disc 13 is slightly less in diameter than the internal diameter of the cylinder so as to leave an annular passageway 15 around the periphery. The disc 13 has a plurality of holes or passageways 16 which are preferably sectoral shaped leaving an outer imperforate rim portion 17.

The inner end of the rod 11 is somewhat reduced and threaded for a short distance as shown at 18, leaving a shoulder 19 at the end of the threaded portion. A second disc or mixing member 20 is threaded to engage with the threads 18 and is adapted to coact with the first-named disc 13. The disc 20 fits closely within the barrel or cylinder 7 and has a plurality of peripheral or sectoral holes or openings 21 through which the material being mixed may pass. The holes or openings 21 are adapted to register with the imperforate portion 17 of the disc 13 when the disc 20 is adjusted for discharging so that the two discs will form a piston for expelling the material from the barrel.

In order to rotate the disc 20 on its threads or to adjust the same with respect to the disc 13, the cover 8 has a pin or projection 22 extending inwardly a short distance and positioned to register with the openings 21 as shown particularly in Fig. 2.

The discharge end of the barrel may be provided with any suitable means for molding the material, as for instance a disc 23 having a central hole or opening 24 of rectangular form or other form for shaping the material as it passes from the barrel. The discharge end is also provided with an imperforate disc or plate 25 for closing the end when the mixing is to be performed, the discs 23 and 25 being held in position by the threaded rim 9 which is arranged to support the same as shown in Fig. 1.

Any suitable means may be provided for adjusting the mixing and piston forming discs with respect to each other, and we have shown a modification in Fig. 5 in which a double thread or screw 26 is made on the end of the piston rod 27 which may be given a greater pitch for more rapid movement of the adjustable disc 28 when it is to be moved from one adjusted position to another. The other features are substantially the same as above described.

Oleomargarine is usually sold uncolored and coloring material supplied therewith for coloring the same. When our improved mixing and forming device is used for mixing these ingredients the disc 20 is adjusted to mixing position as shown in Fig. 1 and raised to the upper end of the cylinder. The cap or closure is removed from the opposite end and the material to be mixed is placed in the barrel. The closure is again applied and by pressing on the handle 12 the discs or mixing members 13 and 20 are forced through the material which is caused to pass around the disc 13 and through the openings 16 therein, and then through the openings 21 in the disc 20 which creates considerable turbulence and causes a rapid mixing action during both movements of the mixing device as the parts are forced up and down through the material.

When the material has been thoroughly mixed, the piston rod 11 is raised until the pin or projection 22 engages with one of the openings 21 and the handle is then turned to cause the threaded portion 18 to screw up through the disc 20 to the position shown in Fig. 2, at which time the imperforate central portion of the disc 20 covers the holes 16 and the imperforate outer portion 17 of the disc 13 will cover the holes 21 in the disc 20. This makes a tight piston as shown in Fig. 4, for expelling the material. The closure disc 25 is then removed and the forming disc 23, or other similar disc, provides the discharge opening of the desired cross section through which the material is forced and molded as for instance in a rectangular form as indicated at 29 in Fig. 4.

We are aware that other mixing devices have heretofore been proposed, such as shown in Patents 1,597,271 and 1,998,692, but we have found such previous devices subject to various objections and that our improved mixer is more efficient and satisfactory in use. Therefore in the following claims we desire to claim our device as broadly as possible in view of the prior art but do not wish to limit the same further than indicated in our claims, in which we claim:

1. In a mixing and molding device, the combination of a barrel for receiving the material to be mixed, closures for the ends of the barrel, a rod slidably mounted in one of said closures and extending into the barrel, a handle for said rod, a pair of mixing and discharging discs mounted on the rod within the barrel and relatively adjustable longitudinally of the rod whereby they may be adjusted to mixing position or to discharging position, each of said discs having holes therethrough and having imperforate portions positioned so that when the discs are brought together the imperforate portions of one disc will cover the holes in the other disc to form a piston and means for adjusting said discs from mixing to discharging position and vice versa.

2. A device as per claim 1 in which one of the discs is rigidly secured to the end of the rod and the other disc is threaded to the rod adjacent to the first-named disc to provide for longitudinal adjustment of the second-named disc to move it from mixing position or spaced away from the first-named disc to discharging position or in contact with the first-named disc.

3. In a device of the character set forth, the combination of a barrel having end closures, a bearing in one of said closures, a piston rod engaging with the bearing and projecting into the barrel, said rod having a threaded and shouldered inner end, a disc secured to the end of the rod and having holes around the center thereof and having an imperforate peripheral portion, a second disc having threaded engagement with the threaded portion of the rod for longitudinal adjustment, and having holes around the periphery thereof and having an imperforate center portion, and means in the barrel for engagement with the last-named disc for holding the same against rotation while the rod is rotated to adjust the disc thereon, the arrangement being such that when the discs are in separated position they will serve for mixing, and when the discs are brought together, the holes in each disc will be closed by the other disc to provide a piston for expelling the material.

4. Mixing and discharging means for a mixing device comprising a rod, a pair of discs mounted for relative longitudinal adjustment on the rod, one of said discs being smaller than the other and having openings therethrough, the other disc also having openings therethrough which do not register with the first-named openings in any adjusted positions of the discs, the arrangement being such that when the discs are in separated position on the rod they will serve for mixing material, and when brought together they will provide a piston for discharging the material.

5. A device of the character set forth, comprising a cylinder having an outlet opening at one end conforming to the cross section of the form desired for the mixed material, a closure for said end, a cap for the opposite end having a bearing therein, a rod slidably engaging with said bearing, and extending into the cylinder, a disc secured to the end of the rod, having a plurality of spaced-apart holes therein and having an imperforate portion, said disc being substantially smaller than the inner diameter of the cylinder, a second disc adjustably secured to the rod adjacent to the first named disc for longitudinal adjustment on the rod, and having holes which do not register with the holes of the first-named disc, said last-named disc fitting closely within the cylinder, and means coacting with the last-named disc for adjusting the same longitudinally of the rod to bring the discs into engagement with each other to provide a piston for extruding the material from the cylinder.

6. A combined mixing and molding device comprising a cylinder for receiving the material to be acted upon, means for closing one end of the cylinder for mixing and for providing an outlet orifice of predetermined shape for molding, a head for the opposite end of the cylinder, a bearing in said head, a rod engaging with said bearing and having a threaded and shouldered inner end, a mixing member secured to the end of the rod and having a perforated portion, a second mixing member engaging with the threaded portion of the rod adjacent to the first-named member and having a perforated portion and an imperforate portion, the perforations in the two mixing members being arranged so that the ones in one member will be closed by the other member when the parts are brought together, and a pin in the head for engagement with the last-named mixing member for holding the same against rotation when the rod is rotated to adjust said member longitudinally of the rod.

7. In a kneading and mixing apparatus, the combination of a barrel, a piston coacting with the barrel and comprising two plates, each plate having perforations therethrough, a piston rod rigidly secured to one of said plates and extending out through the end of the barrel, a handle for said rod, and means within the barrel for adjusting the second plate longitudinally of the rod to move the plates toward and away from each other, the perforations in said plates being out of alignment in all positions whereby the plates will serve for mixing when in separated position and will form the piston when in contact position, as described.

ROBERT K. HOWIE.
JAMES E. HOWIE.